(12) United States Patent
Hong

(10) Patent No.: US 11,655,962 B1
(45) Date of Patent: May 23, 2023

(54) LENS TO PRODUCE HIGH ANGLE OFF-AXIS LIGHT WITH NARROW BEAM WIDTH

(71) Applicant: Dialight Corporation, Farmingdale, NJ (US)

(72) Inventor: Qi Hong, Morganville, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

(21) Appl. No.: 17/704,092

(22) Filed: Mar. 25, 2022

(51) Int. Cl.
*F21V 7/00* (2006.01)
*G02B 27/09* (2006.01)
*G02B 27/30* (2006.01)
*F21Y 115/10* (2016.01)

(52) U.S. Cl.
CPC .......... *F21V 7/0091* (2013.01); *F21V 7/0066* (2013.01); *G02B 27/0916* (2013.01); *G02B 27/0955* (2013.01); *G02B 27/30* (2013.01); *F21Y 2115/10* (2016.08)

(58) Field of Classification Search
CPC . F21V 7/0091; F21V 7/0066; G02B 27/0916; G02B 27/0955; G02B 27/30
See application file for complete search history.

(56) References Cited

U.S. PATENT DOCUMENTS

| | | | |
|---|---|---|---|
| 10,976,023 B1* | 4/2021 | Lim | F21V 5/048 |
| 2018/0156393 A1* | 6/2018 | Seki | G02B 19/0028 |
| 2018/0220508 A1* | 8/2018 | Pilat | F21S 8/061 |
| 2021/0062998 A1* | 3/2021 | Lim | F21V 7/0091 |
| 2022/0170603 A1* | 6/2022 | Wilcox | F21S 8/086 |
| 2022/0231207 A1* | 7/2022 | Tarsa | G02B 19/0028 |

* cited by examiner

*Primary Examiner* — Jong-Suk (James) Lee
*Assistant Examiner* — Christopher E Dunay
(74) *Attorney, Agent, or Firm* — Tong, Rea, Bentley & Kim, LLC

(57) ABSTRACT

The present disclosure is directed to examples of an apparatus. In one embodiment, the apparatus includes a light entry segment that receives light emitted from a light emitting diode (LED), a total internal reflection (TIR) segment to reflect the light towards an optical axis of the LED, and a light redirection segment comprising a plurality of light redirecting segments to redirect the light emitted from the light emitting diode and the light reflected by the TIR segment at an angle greater than 45 degrees relative to an optical axis of the LED.

12 Claims, 9 Drawing Sheets

LENS TO PRODUCE HIGH ANGLE OFF-AXIS LIGHT WITH NARROW BEAM WIDTH

BACKGROUND

Luminaires can be used to illuminate an area. Luminaires can include various types of light sources such as incandescent bulbs or light emitting diodes (LEDs). Currently, LEDs are preferred due to lower energy usage and the ability to provide sufficient light output.

LEDs may emit light in a hemispherical pattern. Lenses and/or optics can be used to shape the pattern of light emitted from the LEDs. Typically, the optics shape the light emitted from the LEDs along the optical axis of the LEDs.

In addition, LEDs may use additional optics to redirect light in a desired direction to maximize the efficiency of the light output. A total internal reflective (TIR) lens is an example of an optic that can be used with LEDs to redirect light.

SUMMARY

In one embodiment, the present disclosure provides an apparatus. In one embodiment, the apparatus comprises a light entry segment that receives light emitted from a light emitting diode (LED), a total internal reflection (TIR) segment to reflect the light towards an optical axis of the LED, and a light redirection segment comprising a plurality of light redirecting segments to redirect the light emitted from the light emitting diode and the light reflected by the TIR segment at an angle greater than 45 degrees relative to an optical axis of the LED.

In one embodiment, the present disclosure provides another embodiment of an apparatus. In one embodiment, the apparatus comprises a substrate, a total internal reflection (TIR) lens formed below the substrate and around a light emitting diode (LED), a first light redirecting segment formed above the substrate and to a first side of the substrate, a second light redirecting segment formed towards a center of the substrate, wherein the second light redirecting segment comprises a first portion formed below a bottom surface and a second portion formed above a top surface of the substrate, and a third light redirecting segment formed above the substrate and to a second side of the substrate that is opposite the first side.

In one embodiment, the present disclosure provides a luminaire. In one embodiment, the luminaire comprises at least one LED to emit light and a lens to redirect the light emitted from the at least one LED at an angle that is 45 degrees or greater relative to an optical axis of the at least one LED. The lens comprises a substrate, a total internal reflection (TIR) lens formed below the substrate and around a light emitting diode (LED), a first light redirecting segment formed above the substrate and to a first side of the substrate, a second light redirecting segment formed towards a center of the substrate, wherein the second light redirecting segment comprises a first portion formed below a bottom surface and a second portion formed above a top surface of the substrate, and a third light redirecting segment formed above the substrate and to a second side of the substrate that is opposite the first side.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present disclosure provides a lens that can produce a high angle off-axis light with a narrow beam width. As discussed above, luminaires can be used to illuminate an area. Luminaires can include various types of light sources such as incandescent bulbs or light emitting diodes (LEDs). Currently, LEDs are preferred due to lower energy usage and the ability to provide sufficient light output.

LEDs may emit light in a hemispherical pattern. Lenses and/or optics can be used to shape the pattern of light emitted from the LEDs. Typically, the optics shape the light emitted from the LEDs along the optical axis of the LEDs.

However, for some applications, it may be desirable to redirect the light from the LED in a narrow beam width at a high angle off-axis direction rather than in a general direction of the optical axis of the LED. For example, the luminaires may be located on the sidelines of a field, and the luminaires may be required to emit light towards the field rather than straight down below the luminaires' locations. Other applications may include lighting for surface mining or other outdoor sports.

The present disclosure provides a lens that can redirect light emitted from an LED to produce a high angle off-axis light. The lens can also produce a generally wide horizontal beam width while maintaining a narrow vertical beam width.

Figure 1:
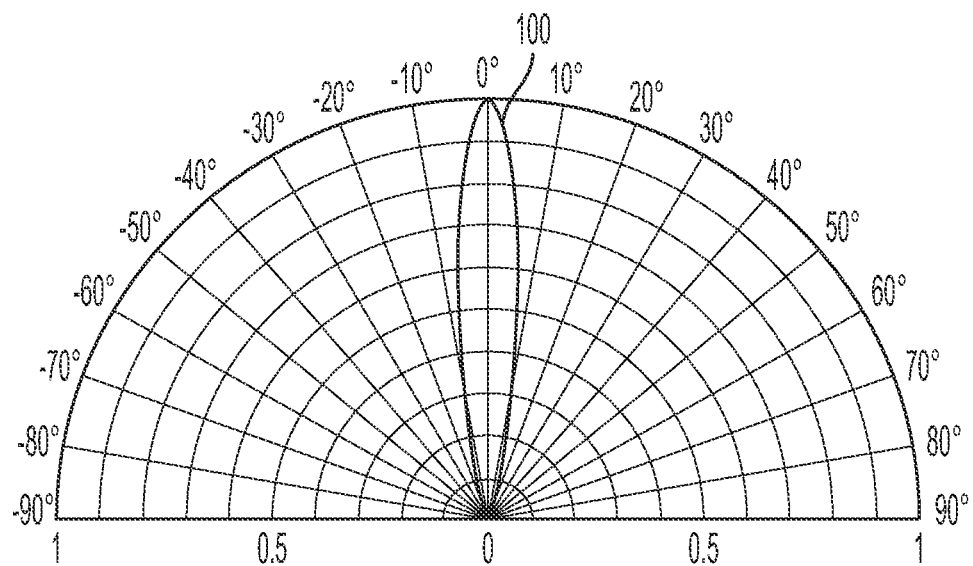
FIG. 1 depicts an example narrow width light beam of an LED light output.

FIG. 1 illustrates an example beam pattern 100. When an LED is located at 0, the optical axis of the LED may point at 0 degrees. With a collimating lenses, the beam pattern 100 may be collimated to be relatively narrow to +/−10 degrees of the optical axis at 0 degrees.

Figure 2:
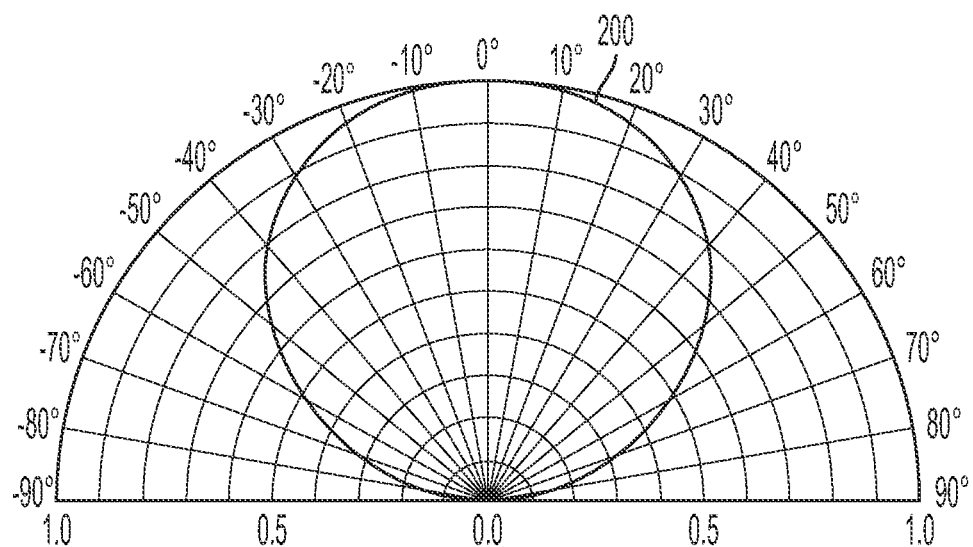
FIG. 2 depicts an example Lambertian light distribution of an LED light output.

FIG. 2 illustrates an example beam pattern 200. When an LED is located at 0, the optical axis of the LED may point at 0 degrees. Without any lenses, the LED may emit light in a Lambertian pattern. As can be seen, the LED may emit light radially outward in all directions.

The inverse-square law of light states that the illuminance on a plane is inversely proportional to the square of the distance between the source and the illuminated point, and is proportional to the cosine of the light incident angle. The relationship is shown by Equation 1 below:

$$E = \frac{I_\theta \cos\theta}{d^2}, \quad \text{Equation 1}$$

where $I_\theta$ is the luminous intensity of the source in the direction of the illuminated point (e.g., along the optical axis of the LED), $\theta$ is the angle between the normal to the plane containing the illuminated point and the line joining the source to the illuminated point, and d is the distance to the illuminated point. To uniformly illuminate an area far away from a light pole, the light intensity profile is determined in accordance with Equation 2 shown below:

$$I_\theta = \frac{Ed^2}{\cos\theta}. \quad \text{Equation 2}$$

Figure 3:
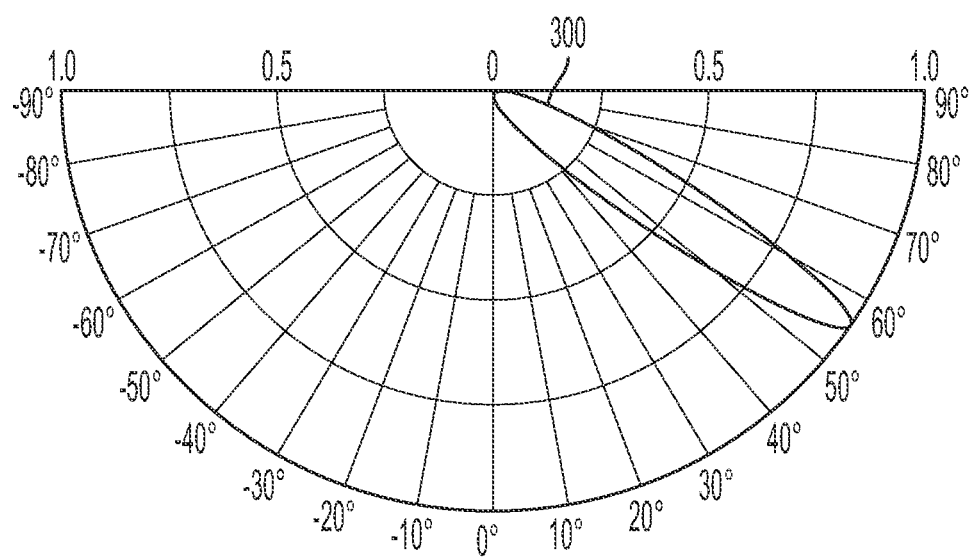
FIG. 3 depicts an example high angle off-axis asymmetrical and narrow light beam emitted by an LED using a lens of the present disclosure.

FIG. 3 illustrates an example beam pattern 300 generated by Equation 2 above. For example, an LED positioned at 0 and pointing downward in a luminaire may have a lens of the present disclosure that can generate the beam pattern 300.

The lens of the present disclosure can turn wide angle light emissions of the LED (e.g., as shown by FIG. 2) into a narrow light beam pointing toward off-axis (e.g., as shown by the beam pattern 300), and be suitable to illuminate a large field from a periphery. In one embodiment, the lens of the present disclosure may redirect light emitted by the LED to high angles (e.g., 45 degrees or greater from the optical axis of the LED) with a narrow vertical beam pattern (e.g., as low as +/−10 degrees relative to the optical axis). The lens of the present disclosure may also spread light with a relatively wide horizontal beam spread (e.g., up to +/−50 degrees) relative to the optical axis to provide wide coverage of a field.

Figure 4:
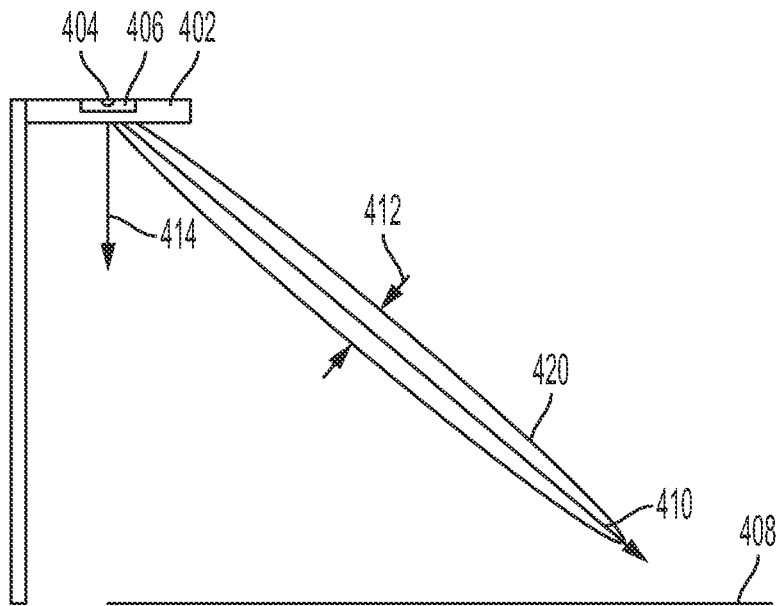
FIG. 4 depicts a block diagram of side view of a luminaire with a lens of the present disclosure used to illuminate a field and an example of a vertical beam spread emitted by the luminaire.

FIG. 4 illustrates an example luminaire 402 with an LED 404 and a lens 406 of the present disclosure. FIG. 4 illustrates a side view of the luminaire 402 on a pole located around a periphery of a field 408. Although a field 408 is used as an example target to be illuminated in FIGS. 4 and 5, it should be noted that the luminaire 402 may be used in other applications (e.g., surface mining, other outdoor arenas, and the like).

FIG. 4 illustrates the LED 404 pointed downward with an optical axis 414 that would be at 0 degrees. The lens 406 of the present disclosure may redirect light emitted by the LED 404 to high angles off-axis towards the field 408 as shown by a vertical beam pattern 420. An arrow 410 illustrates an example direction of the light redirected by the lens 406. In one embodiment, "high angles" may be defined as angles greater than 30 degrees relative to the optical axis 414 of the LED 404. In one embodiment, "high angles" may be defined as angles greater than 45 degrees relative to the optical axis 414.

The lens 406 may also collimate the light in a vertical direction. For example, the lens 406 may collimate the vertical beam pattern 420 to have a vertical beam spread 412 of the light to be from 10 degrees to 90 degrees, from 20 degrees to 70 degrees, or from 20 degrees to 50 degrees. Said another way, the vertical beam spread 412 may be from +/−5 degrees to +/−45 degrees relative to a central light axis of the vertical beam pattern 420 that is represented by the arrow 410. In one embodiment, the vertical beam spread 412 may be from +/−10 degrees to +/−35 degrees relative to the central light axis. In one embodiment, the vertical beam spread 412 may be from +/−10 degrees to +/−25 degrees relative to the central light axis.

Figure 5:
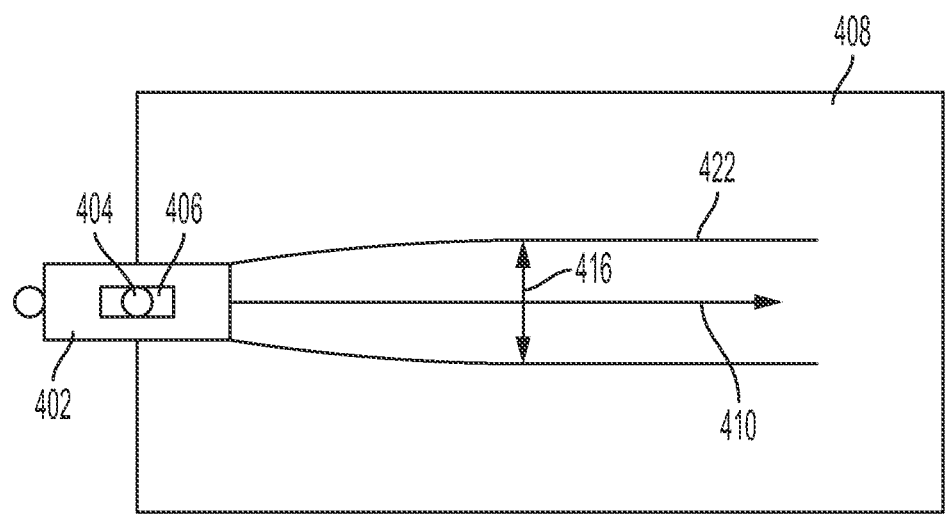
FIG. 5 depicts a block diagram of an overhead view of the luminaire with the lens of the present disclosure used to illuminate the field and an example of a horizontal beam spread emitted by the luminaire.

FIG. 5 illustrates an overhead view of the luminaire 402 looking down at the luminaire 402 and the field 408. The luminaire lens 406 may redirect light to have a horizontal beam pattern 422. As noted above, the lens 406 of the present disclosure may also be designed to spread light in a horizontal direction to provide more coverage of the field. Thus, the lens 406 may reduce light pollution in a vertical direction (e.g., a narrow vertical beam spread 412), but provide wide coverage in a horizontal direction (e.g., a wide horizontal beam spread 416).

FIG. 5 illustrates an example horizontal beam spread 416 of the horizontal beam pattern 422 relative to the central light axis that is represented by the arrow 410. In one embodiment, the horizontal beam spread 416 may be from 20 degrees to 120 degrees, from 40 degrees to 100 degrees, or from 50 degrees to 90 degrees. Said another way, the horizontal beam spread 416 may be from +/−10 degrees to +/−60 degrees relative to the central light axis of the light beam represented by the arrow 410. In one embodiment, the horizontal beam spread 416 may be from +/−20 degrees to +/−50 degrees relative to the central light axis. In one embodiment, the horizontal beam spread 416 may be from +/−25 degrees to +/−45 degrees relative to the central light axis.

Figure 6:
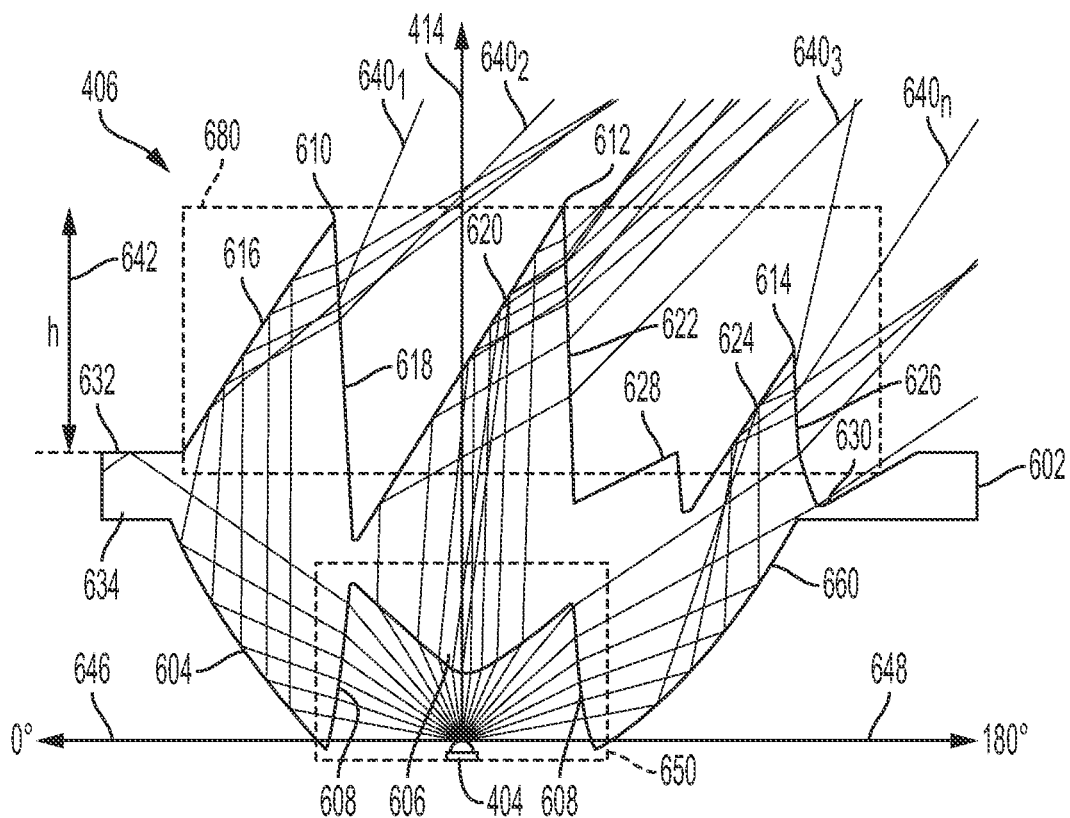
FIG. 6 depicts a cross-sectional side view of a lens of the present disclosure with example light ray traces.

FIG. 6 illustrates an example lens 406 of the present disclosure. In one embodiment, the lens 406 may be fabricated from an optically clear polymer or glass material. The lens 406 may be molded as a single piece to have the shape and features described herein. In another embodiment, the lens 406 may be fabricated by coupling the various features together to form the shapes and features described herein. Optically clear may be defined as any material that allows more than 50% of visible light emitted by the LED 404 to pass through.

In one embodiment, the lens 406 may include a substrate 602. The substrate 602 may have a top surface 632 and a bottom surface 634. A total internal reflection (TIR) lens may be formed below the bottom surface 634 of the substrate 202. The TIR lens 604 may be formed around the LED 404. The TIR lens 604 may form a TIR segment 660 of the lens 406.

In one embodiment, the TIR lens 604 may have a general conical shape. The outer surface of the TIR lens 604 may be angled and/or curved to reflect light emitted from the LED 404 internally and back towards the top surface 632 of the substrate 602. Said another way, the TIR lens 604 may reflect light emitted from the LED 404 in a direction similar to the optical axis 414 of the LED 404.

The angle and/or amount of curvature of the outer surface of the TIR lens 604 may be a function of a size of the lens 406 and/or the size of the LED 404. The TIR lens 604 may be designed to ensure that light rays that strike the outer surface of the TIR lens 604 are redirected as shown by the example light rays 6401 to 640n (hereinafter also referred to a light ray 640 or collectively as light rays 640).

In one embodiment, a light entry segment 650 may receive light emitted by the LED 404. The light entry segment 650 may be formed by a rounded or curved inner wall 608 of the TIR lens 604. The rounded inner wall 608 may be an inner surface that is formed around the LED 404. The light entry segment 650 may also include a conic surface 606 coupled to the rounded inner wall 608. In one embodiment, the conic surface 606 may be below the bottom surface 634 of the substrate 602. In one embodiment, the conic surface 606 may be part of a light redirection segment 612, as discussed in further detail below.

In one embodiment, the conic surface 606 may receive light emitted from the LED 404 at angles from about 60 degrees to about 120 degrees. In one embodiment, the rounded inner wall 608 may receive light emitted from the LED 404 from about 0 degrees to 60 degrees and from about 120 degrees to 180 degrees. The angles may be measured where 0 degrees is located to the left of the LED 404 as shown by a line 646 and 180 degrees is located to the right of the LED 404 as shown by a line 648.

In one embodiment, the lens 406 includes a light redirection segment 680. The light redirection segment 680 may include a plurality of light redirecting segments 610, 612, and 614. The light redirecting segments 610, 612, and 614 may be located above the top surface 632 of the substrate 602. The light redirecting segments 610, 612, and 614 may collect light emitted from the LED 404 and the light redirected by the TIR segment 660 of the TIR lens 604 and redirect the light at a high angle in a collimated vertical beam spread, as shown by the vertical beam pattern 420 in FIG. 4.

In one embodiment, the light redirecting segment 610 includes a TIR surface 616 and a light exiting surface 618. The light redirecting segment 612 includes a TIR surface 620 and a light exiting surface 622. The light redirecting segment 614 includes a TIR surface 624 and a light exiting surface 626. The TIR surface 616 may be angled, and the light exiting surface 618 may be approximately perpendicular or slightly angled (e.g., between about 85 degrees to 90 degrees). The TIR surface 616 may meet the light exiting surface 618 at a peak of the light redirecting segment 610 to form a prism type shape. The TIR surfaces 620 and 624 and the light exiting surface 622 and 626 may be similarly arranged.

In one embodiment, the light redirecting segment 610 may redirect light emitted by the LED 404 at about 0 degrees to 60 degrees and reflected by the TIR lens 604. The light redirecting segment 612 may redirect light emitted by the LED 404 at about 60 degrees to 120 degrees and received by both the conic surface 606 and the TIR lens 604. The light redirecting segment 614 may redirect light emitted by the LED 404 at about 120 degrees 180 degrees and reflected by the TIR lens 604.

In one embodiment, the TIR surfaces 616, 620, and 624 may be shaped and angled to internally reflect light rays 640 at a high angle and to collimate the light rays 640 in a vertical direction. The angle and shape of the TIR surfaces 616, 620, and 624 may be different to accommodate the different angles at which the light rays 640 may enter the respective light redirecting segments 610, 612, and 614. The light rays 640 may be reflected by the TIR surfaces 616, 620, and 624 and the light rays 640 may exit via the light exiting surfaces 618, 622, and 626. The light exiting surfaces 618, 622, and 626 may be shaped and/or angled to allow the light rays 640 to pass through without changing the angle, or direction, at which the light rays 640 are traveling.

In one embodiment, the plurality of light redirecting segments 610, 612, and 614, may have different heights "h" as measured in a dimension shown by line 642. For example, the different heights may prevent light rays 640 exiting one of the light redirecting segments 610, 612, and 614 from being blocked by another one of the light redirecting segments 610, 612, and 614. For example, the light redirecting segment 624 may have a shorter height than the light redirecting segment 612. The light redirecting segment 610 may be the same height or shorter than the light redirecting segment 612. In another embodiment, the plurality of light redirecting segments 610, 612, and 614 may have a same height.

In one embodiment, the lens 406 may include a refractive segment 628. The refractive segment 628 may be located between the light redirection segment 612 and the light redirection segment 614. The refractive segment 628 may be optically clear to allow the light rays 640 to pass through.

In one embodiment, the refractive segment 628 may be positioned to refract light emitted from the LED 404 that is already traveling at the desired high angle off-axis direction that the other light rays 640 may be redirected towards. For example, some of the light emitted by the LED 404 may already be traveling at the desired angles and may not need to be reflected or redirected. In one embodiment, the refractive segment 628 may be positioned to refract light emitted from the LED 404 from about 35 degrees to 80 degrees. In one embodiment, the refractive segment 628 may be positioned to refract light emitted from the LED 404 from about 45 degrees to about 60 degrees. In one embodiment, the refractive segment 628 may be positioned to refract light emitted from the LED 404 at about 45 degrees +/−10 degrees.

In one embodiment, the lens 406 may also include a groove 630 may be formed in the top surface 632 of the substrate 602. The groove 630 may be located between the light redirection segment 614 and the outer edge of the substrate 602. The groove 630 may have a concave shape. The groove 630 is shaped to allow some of the light rays 640 that are redirected by the light redirection segment 614 to exit unimpeded. In other words, the groove 630 prevents some of the light rays 640 from being blocked by the substrate 602. Without the groove 630, the substrate 602 may have a sharp corner and a vertical wall. The vertical wall could block some of the light emitted from the lower part of the light redirection segment 614.

In one embodiment, the lens 406 may also be designed to have a relatively low profile (e.g., a shorter height in the dimension shown by the line 642). The light redirection segment 612 may be formed by the TIR surface 620 and the light exiting surface 622 that is above the top surface 632 of the substrate 602. The light redirection segment 612 may also comprise the conic surface 606 that is below the bottom surface 634 of the substrate 602. The conic surface 606 may be positioned to be below the bottom surface 634 to reduce the height of the light redirection segment 612. Thus, a lower overall height profile for the lens 406 can be achieved.

If the conic surface 606 were positioned on top of top surface 632 of the substrate 602, the light redirection segment 612 would stand much higher than the other light redirection segments 610 and 614 and cause the lens 406 to have a relatively high profile that is undesirable.

Figure 7:
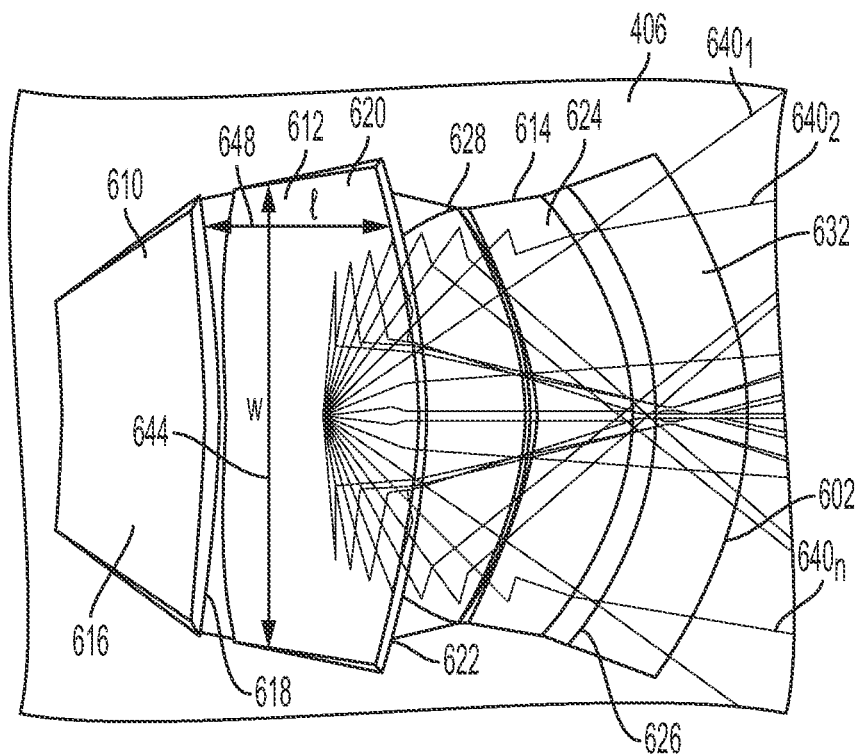
FIG. 7 depicts an overhead view of the lens of the present disclosure with example light ray traces.

FIG. 7 illustrates a top view of the lens 406. In one embodiment, the light redirection segments 610, 612, and 614 may have a shape that is wider along a width measured in a dimension shown by a line 644 than a length measured in a dimension shown by a line 648. The wider dimension may allow the lens 406 to spread light along a horizontal direction while collimating the light along a vertical direction as shown in FIGS. 4 and 5, and described above.

In one embodiment, the light exiting surfaces 618, 622, and 626 may have a curved surface along the horizontal plane or width (e.g., the dimension along the line 644). For example, the light redirection segments 610, 612, and 614 may be formed into a curved prism, wherein the light exiting surfaces 618, 622, and 626 are curved. The amount of curvature for each of the light exiting surfaces 618, 622, and 626 may be the same or may vary to control the horizontal beam pattern 422.

Figure 11:
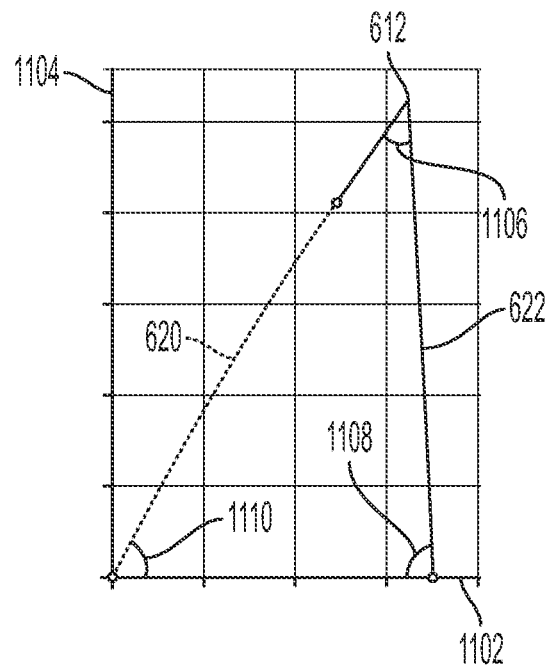
FIG. 11 depicts an example light redirection segment of the lens of the present disclosure with a straight light exiting surface.
Figure 12:
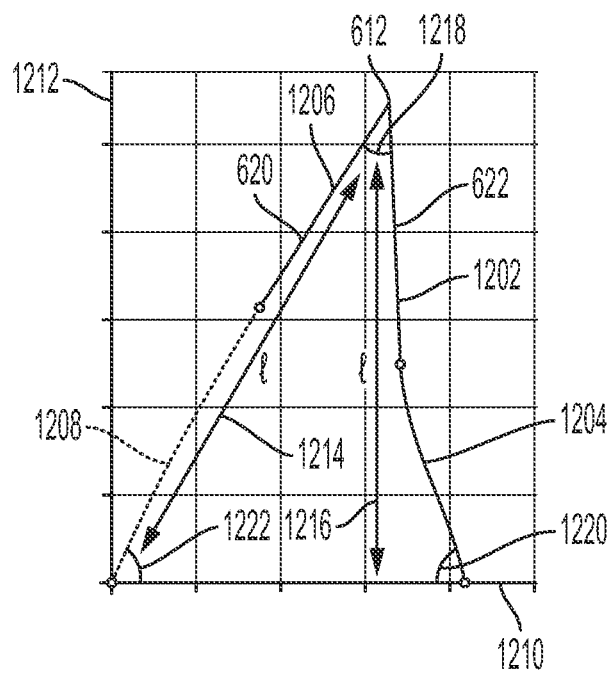
FIG. 12 depicts an example light redirection segment of the lens of the present disclosure with a curved light exiting surface.

FIGS. 11 and 12 show an example cross-section of the TIR surfaces 616, 620, and 624. The TIR surfaces 616, 620, and 624 and the light exiting surfaces 618, 622, and 626 may be straight, curved, or a combination of straight and curved surfaces in a vertical plane or height (e.g., the dimension along the line 642). FIG. 11 illustrates an example light redirection segment 612 with the TIR surface 620 and the light exiting surface 622. It should be noted that the description of the light redirection segment 612 in FIG. 11 can be equally applicable to the light redirection segments 610 and 614.

FIG. 11 illustrates an example where the TIR surface 620 has a straight surface in the vertical plane and the light exiting surface 622 has a straight surface in the vertical plane. In one embodiment, the light exiting surface 622 may be approximately perpendicular to the plane 1102. However, the TIR surface 620 and the light exiting surface 622 may be curved along the horizontal plane when looking from above the light redirection segment 612, as illustrated in FIG. 7.

In one embodiment, the light exiting surface 622 may be positioned such that an angle 1108 is from about 80 degrees to about 90 degrees relative to the plane 1102. In one embodiment, the TIR surface 620 may be positioned at an angle 1110 that is less than the angle formed by the light exiting surface 622 and the plane 1102. The angle 1110 may be greater than or equal to 45 degrees to ensure that the light rays 640 that are reflected are redirected away from the lens 406 and not back towards the lens 406. In one embodiment, the TIR surface 620 and the light exiting surface 622 may meet to form an angle 1106 that is less than 90 degrees.

FIG. 12 illustrates an example light redirection segment 612 with the TIR surface 620 and the light exiting surface 622 that are curved in the vertical plane. It should be noted that the description of the light redirection segment 612 in FIG. 12 can be equally applicable to the light redirection segments 610 and 614.

FIG. 12 illustrates an example where the TIR surface 620 has a combination of a straight surface segment 1206 and a curved surface segment 1208 in the vertical plane and the light exiting surface 622 has a combination of a straight surface segment 1202 and a curved surface segment 1204 in the vertical plane. In one embodiment, about 5% to 95% of a length 1214 of the TIR surface 620 may be the curved surface segment 1208 and the remainder of the length 1214 may be the straight surface segment 1206. In one embodiment, the curved surface segment 1208 may be about 50% of the length 1214 of the TIR surface 620 and 50% the straight surface segment 1206.

In one embodiment, about 5% to 95% of a length 1216 of the light exiting surface 622 may be the curved surface segment 1204 and the remainder of the length 1216 may be the straight surface segment 1202. In one embodiment, the curved surface segment 1204 may be about 50% of the length 1216 of the light exiting surface 622 and 50% the straight surface segment 1202.

In one embodiment, the light exiting surface 622 may be approximately perpendicular to the plane 1210. However, the TIR surface 620 and the light exiting surface 622 may be curved along the horizontal plane when looking from above the light redirection segment 612, as illustrated in FIG. 7.

In one embodiment, the light exiting surface 622 may be positioned such that an angle 1220 is from about 80 degrees to about 90 degrees relative to the plane 1210. In one embodiment, the TIR surface 620 may be positioned at an angle 1222 that is less than the angle formed by the light exiting surface 622 and the plane 1210. The angle 1222 may be greater than or equal to 45 degrees to ensure that the light rays 640 that are reflected are redirected away from the lens 406 and not back towards the lens 406. In one embodiment, the TIR surface 620 and the light exiting surface 622 may meet to form an angle 1218 that is less than 90 degrees.

Figure 8:
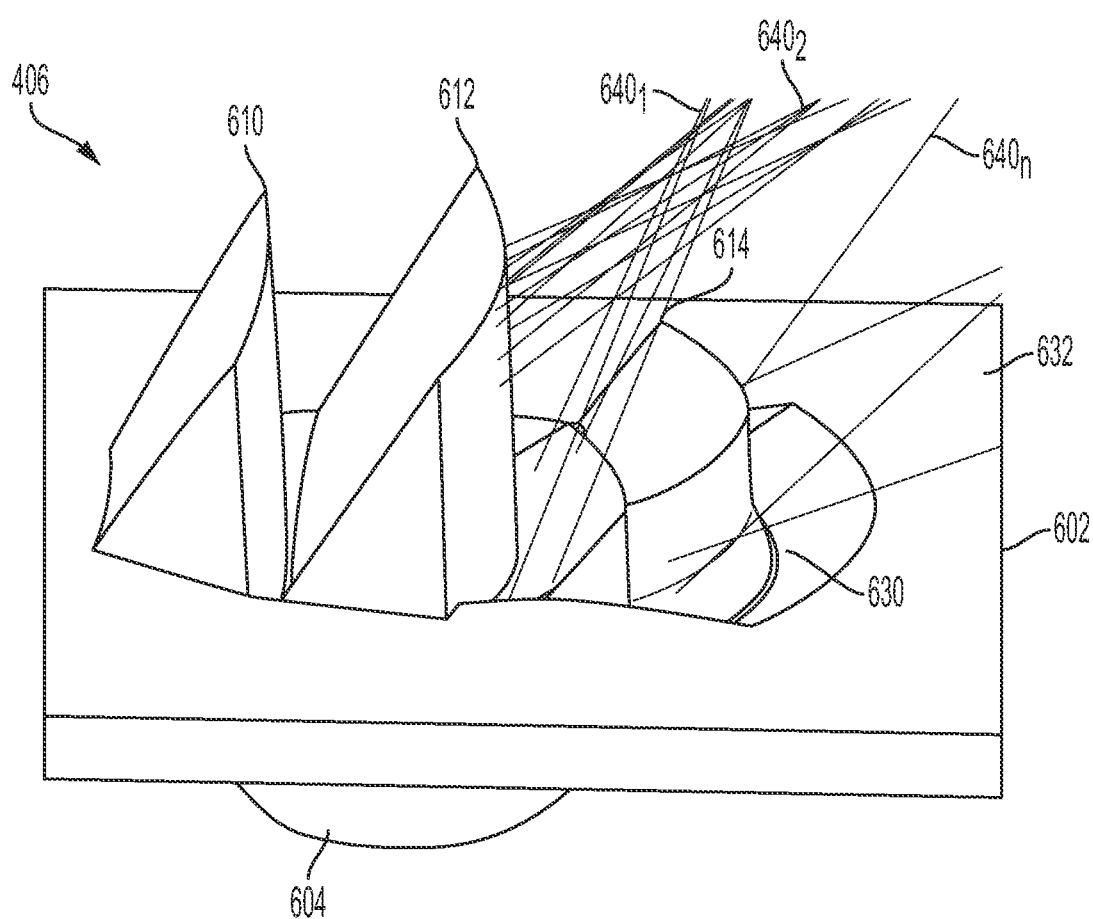
FIG. 8 depicts an isometric view of the lens of the present disclosure with example light ray traces.

FIG. 8 illustrates an example isometric view of the lens 406. The isometric view shows the general curved prism shape of the light redirection segments 610, 612, and 614. The isometric view of the lens 406 also shows a concave shape of the groove 630.

Figure 9:
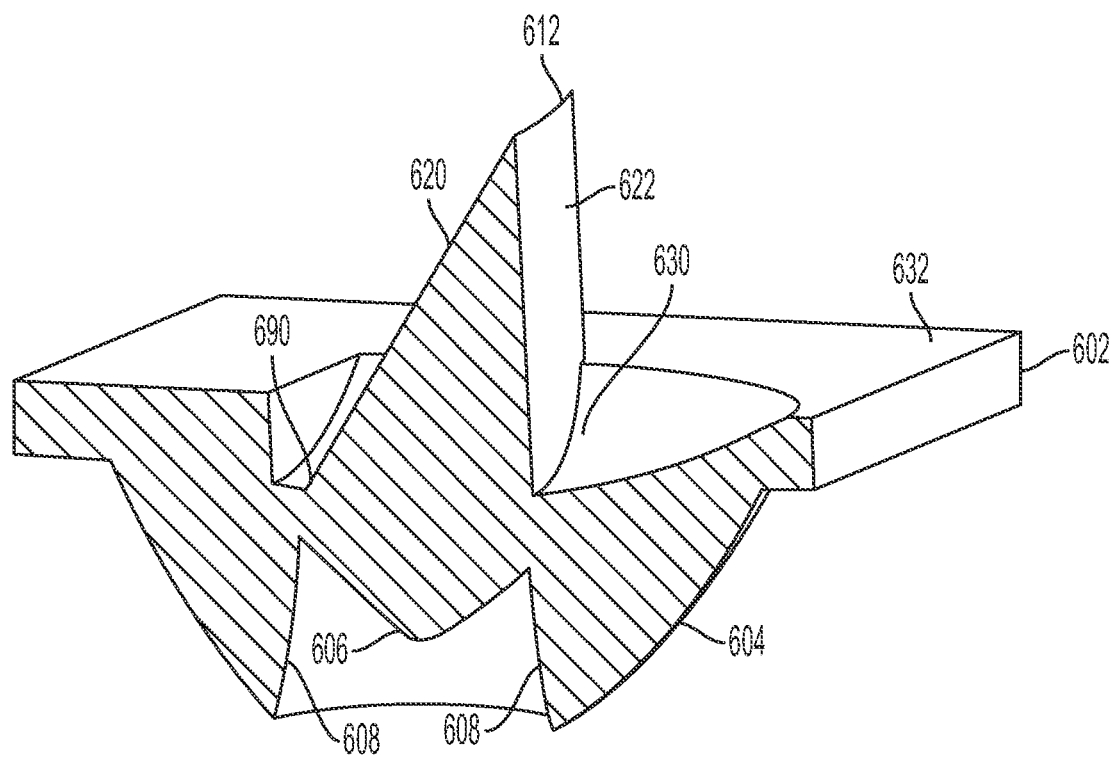
FIG. 9 depicts a cross-sectional view of a single light redirection segment of the lens of the present disclosure.

FIG. 9 illustrates a cross-sectional isometric view of a single light redirection segment 612. FIG. 9 illustrates a better view of how the light redirection segment 612 includes the TIR surface 620 and the light exiting surface 622 that extend above the top surface 632 of the substrate 602. However, a base 690 of TIR surface 620 and the light exiting surface 622 lies below the top surface 632 of the substrate 602. In one embodiment, the base 690 may be coupled to the conic surface 606 that is positioned below the top surface 632 of the substrate 602 and below the base 690.

As discussed above, the positioning and design of the light redirection segments 610, 612, and 614 is to provide a low overall profile for the lens 406. By placing the conic surface 606 below the top surface 632 and below the base 690 and including the groove 630, the light redirection segment 612 can be lowered. Thus, the height 642 (illustrated in FIG. 6), can also be reduced. In other words, the conic surface 606 allows the light redirection segment 612 to be placed lower and below the top surface 632 of the substrate to reduce the overall height 642 or profile of the lens 406.

The concave shape of the groove 630 may also provide a cut-out below the top surface 632 of the substrate 602. The groove 630 can provide an angled surface that eliminates the 90 degree corner and steep wall that could potentially block some light rays 640 that exit near the bottom of the light redirection segments 610, 612, and 614.

Thus, the design of the lens 406 provides an optic for LEDs that can redirect light at high angles off-axis. The lens 406 can provide a relatively wide beam spread in the horizontal direction to provide wide coverage of a field, but also collimate the light to have a relatively narrow beam spread in the vertical direction to provide a more uniform illumination of a field at the same time to reduce light pollution above the horizon.

Figure 10:
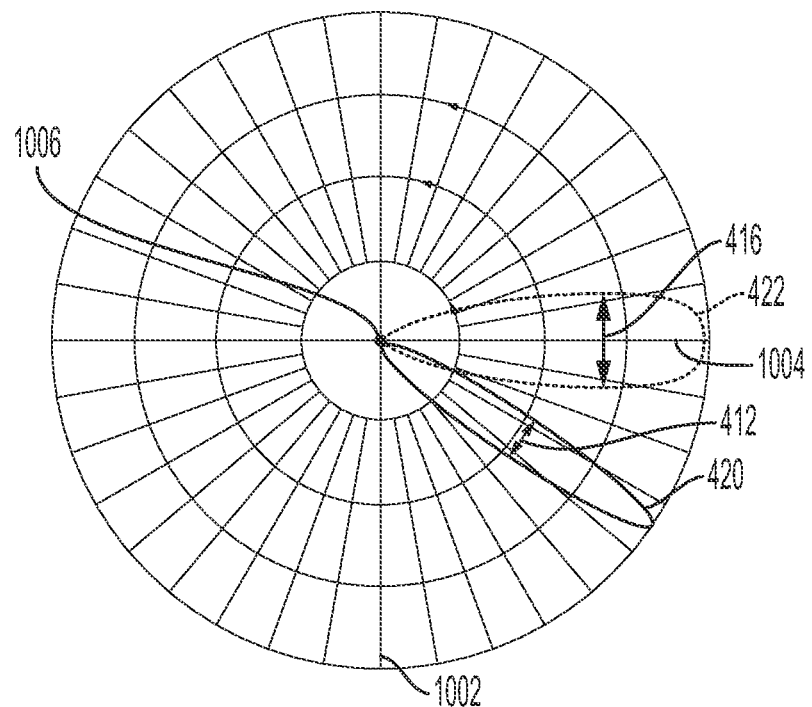
FIG. 10 depicts an example horizontal and vertical beam spread of light emitted from an LED and through the lens of the present disclosure.

FIG. 10 illustrates an example vertical beam pattern 420 and an example horizontal beam pattern 422. For the vertical beam pattern 420, the optical axis 414 (shown in FIGS. 4 and 5) of the LED may be represented by the line 1002 on the graph. The vertical beam pattern 420 may be greater than 45 degrees from the line 1002, illustrating the high angle off-axis direction of the vertical beam pattern 420, also illustrated in FIG. 4 and discussed above.

As discussed above, the vertical beam pattern 420 may have a beam spread 412 from about 10 degrees to 90 about degrees, from about 20 degrees to about 70 degrees, or from about 20 degrees to about 50 degrees. The term "about" may imply +/−1 degree in either direction.

When viewing the horizontal beam pattern 422, the optical axis 414 may be going into the page at the center point 1006. A line 1004 of the graph may represent 0 degrees for the horizontal beam pattern 422. The horizontal beam pattern 422 may have a beam spread 416 that is wider than the beam spread 412 of the vertical beam pattern 420.

As discussed above, the horizontal beam pattern 422 may have a beam spread 416 from about 20 degrees to about 120 degrees, from about 40 degrees to about 100 degrees, or from about 50 degrees to about 90 degrees. The term "about" may imply +/−1 degree in either direction.

Figure 13:
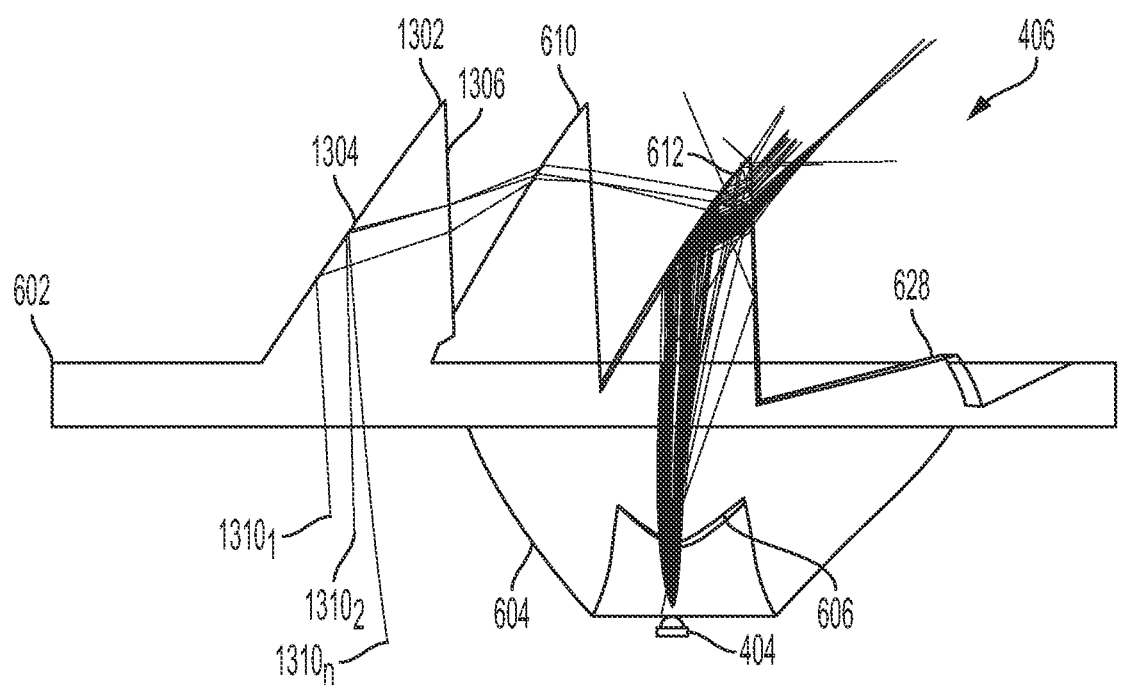
FIG. 13 depicts an example lens with a light recycling segment in a first direction.
Figure 14:
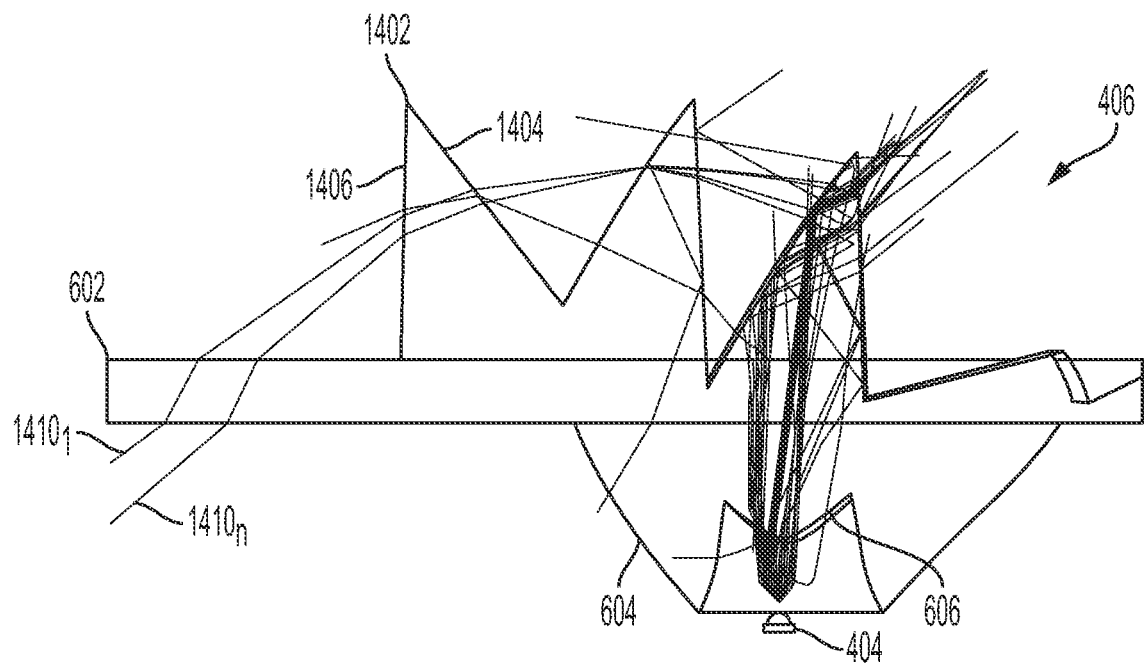
FIG. 14 depicts an example lens with a light recycling segment in a second direction.
Figure 15:
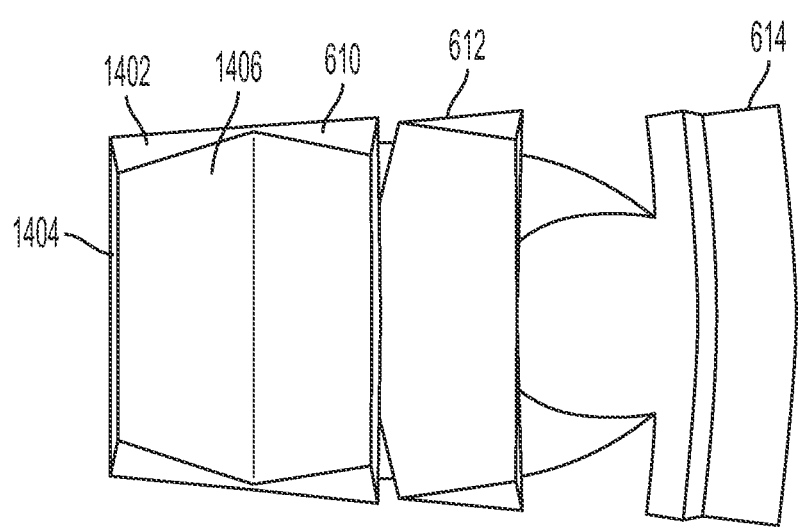
FIG. 15 depicts a top view of the example lens with the light recycling segment in the second direction.

FIGS. 13-15 illustrate examples of the lens 406 that include a light recycling segment. For example, there may be a small amount of light that may escape the luminaire 402 into the horizon or sky. The small amount of light may cause light pollution. The light recycling segment may capture the small amount of light and redirect it towards the printed circuit board or housing of the luminaire 402.

FIG. 13 illustrates an example of the lens 406 with a light recycling segment 1302. The light recycling segment 1302 may include a TIR surface 1304 and a light entering surface 1306. The dimensions and shape of the light recycling segment 1302 may be similar to the light redirecting segment 610, as described above.

In one embodiment, the light recycling segment 1302 may be formed with the light redirecting segment 610 as a single piece. In one embodiment, the light recycling segment 1302 may be positioned adjacent to or up against the light redirecting segment 610.

Some light rays 13101 to 1310n may escape the TIR surfaces of the light redirecting segments 610, 612, and 614. Without the light recycling segment 1302, the light rays 13101 to 1310n would be directed towards the sky and cause light pollution. Instead, the light recycling segment 1302 may be positioned behind the light redirecting segment 610 to capture the escaping light rays 13101 to 1310n.

The light rays 13101 to 1310n may enter the light recycling segment 1302 through the light entering surface 1306. The TIR surface 1304 may redirect the light rays 13101 to 1310n back towards the substrate 602 and back into the housing of the luminaire 402 and towards a printed circuit board of the luminaire 402.

FIG. 14 illustrates an example of the lens with a light recycling segment 1402. The light recycling segment 1402 may include a light entering surface 1404 and a light exiting surface 1406. The dimensions and shape of the light recycling segment 1402 may be similar to the light redirecting segment 610, as described above.

In one embodiment, the light recycling segment 1402 may be formed with the light redirecting segment 610 as a single piece. In one embodiment, the light recycling segment 1402 may be positioned adjacent to or up against the light redirecting segment 610.

The light recycling segment 1402 may be similar to the light recycling segment 1302 except that the light recycling segment 1402 is oriented in a direction opposite to a direction of the light recycling segment 1302. Said another way the light recycling segment 1402 is rotated 180 degrees relative to the light recycling segment 1302. In other words, the light recycling segment 1402 is positioned such that the light entering surface 1404 is closer to the light redirecting segment 610 and the light exiting surface 1406 may be positioned away from the light directing segment 610.

Some light rays 14101 to 1410n may escape the TIR surfaces of the light redirecting segments 610, 612, and 614. Without the light recycling segment 1402, the light rays 14101 to 1410n would be directed towards the sky and cause light pollution. Instead, the light recycling segment 1402 may be positioned behind the light redirecting segment 610 to capture the escaping light rays 14101 to 1410n.

The light rays 14101 to 1410n may enter the light recycling segment 1402 through the light entering surface 1404. The light entering surface 1404 may redirect the light rays 14101 to 1410n back towards the substrate 602 inside of the light recycling segment 1402. The light rays 14101 to 1410n may exit the light exiting surface 1406 back towards the substrate 602 and into the housing of the luminaire 402 and towards a printed circuit board of the luminaire 402.

FIG. 15 illustrates a top view of the light recycling segment 1402. In the example illustrated in FIG. 15, the light recycling segment 1402 is formed as a single piece with the light redirecting segment 610. FIG. 15 also illustrates how the shape and dimensions are similar to the shape and dimensions of the light redirecting segment 610.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   a substrate;
   a total internal reflection (TIR) lens formed below the substrate and around a light emitting diode (LED);
   a first light redirecting segment formed above the substrate and positioned to a first side of the substrate;
   a second light redirecting segment formed towards a center of the substrate, wherein the second light redirecting segment comprises a first portion formed below a bottom surface of the substrate and a second portion formed above a top surface of the substrate; and
   a third light redirecting segment formed above the substrate and positioned to a second side of the substrate that is opposite the first side.

2. The apparatus of claim 1, further comprising:
   a groove formed below the top surface of the substrate and between the third light redirecting segment and the second side of the substrate.

3. The apparatus of claim 1, wherein the first light redirecting segment redirects light emitted from the LED at an angle from 180 degrees to 120 degrees.

4. The apparatus of claim 1, wherein the second light redirecting segment redirects light emitted from the LED at an angle from 60 degrees to 120 degrees.

5. The apparatus of claim 1, wherein the third light redirecting segment redirections light emitted from the LED at an angle from 0 degrees to 60 degrees.

6. The apparatus of claim 1, further comprising:
a refractive segment located between the second light redirecting segment and the third light redirecting segment, wherein the refractive segment allows a portion of light emitted from the LED to pass through.

7. The apparatus of claim 1, wherein the first light redirecting segment, the second light redirecting segment, and the third light redirecting segment each comprise:
a light exiting surface; and
a TIR surface that is coupled to the light exiting surface at an angle.

8. The apparatus of claim 1, further comprising:
a light recycling segment positioned adjacent to the first light redirecting segment to redirect light that escapes from the first light redirecting segment, the second light redirecting segment, and the third light redirecting segment back towards the substrate.

9. The apparatus of claim 8, wherein the light recycling segment comprises:
a light entering surface; and
a TIR surface or a light exiting surface.

10. A luminaire, comprising:
at least one light emitting diode (LED) to emit light; and
a lens to redirect the light emitted from the at least one LED at an angle that is 45 degrees or greater relative to an optical axis of the at least one LED, the lens comprising:
a substrate;
a total internal reflection (TIR) lens formed below the substrate and around the at least one LED;
a first light redirecting segment formed above the substrate and positioned to a first side of the substrate;
a second light redirecting segment formed towards a center of the substrate, wherein the second light redirecting segment comprises a first portion formed below a bottom surface of the substrate and a second portion formed above a top surface of the substrate; and
a third light redirecting segment formed above the substrate and positioned to a second side of the substrate that is opposite the first side.

11. The luminaire of claim 10, wherein the light emitted from the at least one LED that is redirected from the lens is collimated to have a vertical beam spread from 10 degrees to 50 degrees.

12. The luminaire of claim 10, wherein the light emitted from the at least one LED that is redirected from the lens is spread to have a horizontal beam spread from 50 degrees to 100 degrees.

* * * * *